Dec. 13, 1927.
C. C. ARMSTRONG
1,652,292
COOKING RANGE
Filed Aug. 4, 1926
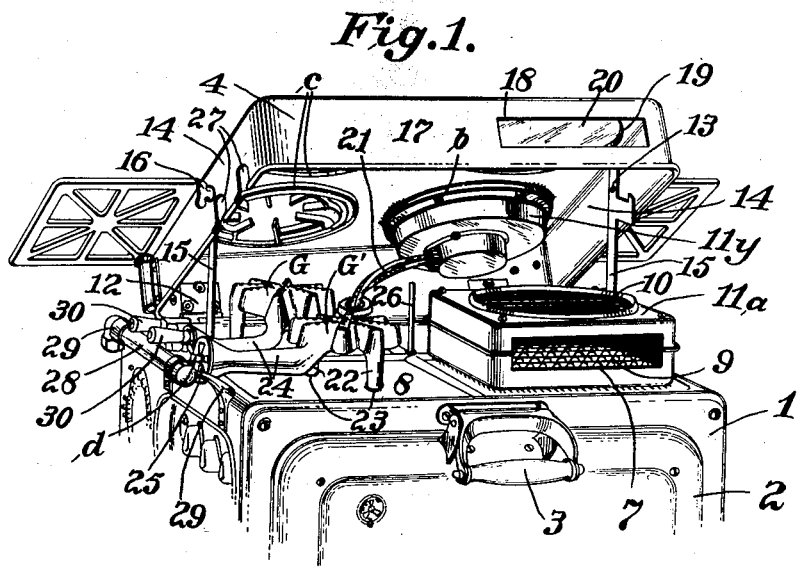
Fig.1.
Fig.2.
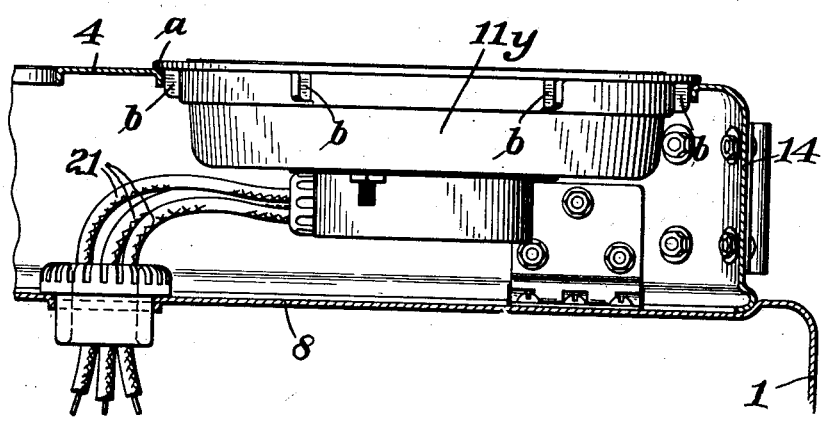
Inventor:
Charles C. Armstrong,
by Spear, Middleton, Donaldson & Hall
Attys.

Patented Dec. 13, 1927.

1,652,292

UNITED STATES PATENT OFFICE.

CHARLES C. ARMSTRONG, OF HUNTINGTON, WEST VIRGINIA.

COOKING RANGE.

Application filed August 4, 1926. Serial No. 127,037.

The invention in one aspect concerns an electric range in which the body contains an oven, with an electric heater therein and a plurality of electric heaters above the top of the stove located within a space enclosed by a cover member hinged to the body to be lifted to gain access to said plurality of heaters and to the top of the body.

In another aspect my invention concerns the combination of gas and electric heaters arranged in the space enclosed by the cover member, all of which are rendered accessible by the lifting of said cover, which when in lowered position conserves the heat.
The accompanying drawing shows in Fig. 1 a perspective view of a portion of the body of the stove with the cover member raised, exposing to view the heaters, electric and gas.
Fig. 2 is a view of the mounting of the suspended heater.

In this drawing 1 indicates the stove body which contains an oven in which there are electric heating means. The oven is double walled to provide a dead air space for heat insulation and said oven is spaced apart from the wall of the body to secure augmentation of the heat insulating effect by providing a heat insulating dead air space between the oven and the wall of the body. 2 indicates a part of the oven door and 3 the handle by which the door is operated. At $11^a$ is shown an electric heater element which is removably mounted on the top plate 8 of the stove body. This heating element has electric contacts on its bottom engaging electric contacts in sockets in the top plate 8. This heating element has heating means or coils 9 and 10 to which current is led by the said contacts, and it has a front opening 7 in its casing adapting the heating element to receive a toaster or waffle irons which are slid into place through said opening 7 or removed therefrom at will. The cover section 4 is hinged to the stove body, one of said hinges, of which there are two at the rear, being shown at 12. In the drawing this top plate is shown in its raised position, it being supported by standards pivoted thereto as at 13 on the inner side of its depending side wall 14. There are two of these standards as shown at 15, one at each side, and they are both pivotally mounted as just stated.

Each is operated by a finger button, one of which is shown at 16. By grasping these buttons and lifting thereon, the cover member is swung up into the position shown and by turning these buttons the supports or standards are adjusted to the vertical positions shown to support the cover in said elevated position, the lower ends of the supports resting on the stove top. When the cover member is down in its normal position it encloses a space above the top plate 8 of the stove and consequently it encloses in said space the heating element $11^a$. The front depending wall 17 of this cover member has an opening 18 to register with the opening 7 in the casing of the heating element $11^a$ so that the toaster or waffle irons may be placed within the electric heater or removed therefrom when the cover member is down in normal position.

The upper heating coil or element 10 underlies a circular opening 19 in the top of the cover member where the latter is down so that heat from this coil 10 will act against the bottom of a cooking vessel placed over said opening. Or as the opening is adapted to receive a removable plate, indicated at 20, the cooking vessel can be placed on this plate and receive heat from the burner beneath. It will be noticed in this connection that while the casing of the heating element $11^a$ is rectangular to receive the toaster or waffle irons the upper heating coil or member 10 thereof is of circular form, to act in connection with a cylindrical or circular cooking utensil.

This heating member 10 will also act to heat the toaster or waffle irons from above while the heating coil or member 9 heats the said toaster or waffle iron from below.

At $11^y$ is shown a heating element, which is suspended from the top of the cover member. It is of the closed heater type, that is to say, its heating coil is embedded in the body of this element, or is protected from damage by the spilling thereon of contents of the cooking vessel. It is of rugged construction and needs no replacement under normal conditions of use. It therefore is intended that the mounting of this heating element be substantially permanent. Current is led to this burner through the conductors 21.

These conductors are passed down through an opening in the top of the stove body near the rear edge thereof to a suitable switch base mounted at a convenient place on the stove body. This connection is permanent in the sense that it is not necessary to disturb it because the burner is not intended to be removed or replaced with any degree of frequency.

For mounting this heating element it is provided with a flange $a$ to overlie the edge about the opening in the top plate of the cover, said flange or rim having centering lugs $b$. The element is simply dropped into the opening to be supported by the flange just mentioned.

When the cover member is raised the burner $11^r$ is raised with it and access then can be had to the top plate of the stove body for cleaning, and for this purpose also, as well as for purposes of renewal, the burner or heating element $11^a$ readily can be removed by simply lifting it from the electric contact sockets in which it is supported. The removal of the heating element $11^a$ allows the top of the stove to be cleaned.

I may use three heating elements like that shown at $11^r$ in an all electric stove and one heater like $11^a$ to make up the complete equipment of the heating means at the top of the stove of the four burner type. The heating elements $11^a$ and $11^r$ may be employed in association with other forms of heating elements arranged in the space within the cover member and at the top of the stove and I have shown gas burners at G, G' mounted on the top plate of the stove body, for which purpose each burner is provided with a pair of legs 22 fitting into sockets or depressions 23 in said stove top plate. These burners have horizontal stems 24 which are provided with the usual air inlets 25, and each stem at its end has an opening to receive the nipple $d$ of the gas supply pipe. These burners are readily removable by lifting them from the sockets and slipping their stem portions out of connection with the gas nipples.

These gas burners like the electric burners described above are located in the space enclosed by the cover member, which conserves the heat and provides a warming platform upon which cooking vessels may rest to maintain their contents in warm condition.

The stove can be converted into an all electric stove by removing the two gas burners, removing the grates $c$, of which there is one for each gas burner, and dropping into the openings thus left in the top of the cover electric heating elements like that shown at $11^r$ and making electrical connection thereto through conductors like 21.

At 26 I provide a post upon which the top plate of the cover member bears when the latter is in its low position. This post will support the top plate from sagging under the weight of the burner or burners $11^r$ suspended therefrom.

At 27 notches are formed in the depending side of the cover member to receive the stems or shanks of the gas burners when the cover member is lowered.

The gas supply pipe section which is mounted on the stove body is shown at 28. Brackets 29 form the support for this gas pipe section. The usual valves are employed for controlling the gas supply. The handles of these valves are shown at 30.

Certain features disclosed and not claimed herein form subject matter of a co-pending application.

I claim:

1. A stove having a body, a cover member hinged thereto, an electric heater element supported removably on the top of the body within the space enclosed by the cover, said heating element having a casing with an opening to receive a toaster or other utensil, and said cover having an opening to register with the opening in the casing of said heating element, and an electric heating element carried by the cover and mainly depending from said cover into the space enclosed thereby, substantially as described.

2. A stove having a body, a cover member hinged thereto, and enclosing a space above the top of said body, and an electric heating element exposed at an opening in said cover, said heating element being attached to said cover and having its main body portion depending into said space, and a second electric heating element mounted on the top of the body and located in the space enclosed by said cover, substantially as described.

3. In combination, a stove body, a cover hinged thereto and enclosing a space above the top of the said stove body, an electric heater supported by the top plate or cover member and exposed at an opening in said top plate, said electric heating element having its main body portion depending into said enclosed space, and a post on the top of the stove body with which the top of the cover member contacts to be supported thereby, substantially as described.

4. In combination, a stove body, a cover member hinged to said body and enclosing a space above the top of said body, an electric heating element in said space to act on a utensil supported on the top of said cover, a gas heating element removably mounted on the top of the stove and in the said space, to act on a utensil mounted on the top of the cover, said elements being accessible only when the cover is up, substantially as described.

5. In combination, a stove body, a cover member hinged to the body and enclosing a space above the top of the body, an electric heating element in said space, and a gas heating element in said space having legs entering sockets in the top of the body, said cover having an opening in its top through which the flame from the gas burner plays, said electric heating element and the gas heating element being removable to clear the top of the stove body.

6. In combination, a stove body having a hinged cover member consisting of a top plate and walls depending therefrom to enclose a space above the top of the stove body, an electric heating element arranged in said space, a gas burner arranged in said space having a stem extending to the outside of the stove cover for connection with its supply pipe, one of the depending walls of said cover being notched to fit over the said stem, substantially as described.

7. In combination a stove body, a cover member hinged thereto, a burner supported removably on the top plate of the stove body and enclosed by said cover, and a burner carried by the cover and depending therefrom, the top plate of the stove body being cleared of said burners by raising the cover, thereby removing the depending burner and by removing the other burner from said top plate, substantially as described.

In testimony whereof, I affix my signature.

CHARLES C. ARMSTRONG.